(12) United States Patent
Lauterbach et al.

(10) Patent No.: US 12,504,392 B2
(45) Date of Patent: Dec. 23, 2025

(54) DEVICE FOR THE DETERMINATION OF TEMPERATURE PARAMETERS WITH ADJUSTABLE SAMPLE HOLDER

(71) Applicant: NETZSCH-Gerätebau GmbH, Selb (DE)

(72) Inventors: Stefan Lauterbach, Döhlau (DE); Martin Brunner, Konradsreuth (DE); Artem Lunev, Selb (DE)

(73) Assignee: NETZSCH-Gerätebau GmbH, Selb (DE)

( * ) Notice: Subject to any disclaimer, the term of this patent is extended or adjusted under 35 U.S.C. 154(b) by 558 days.

(21) Appl. No.: 17/936,100

(22) Filed: Sep. 28, 2022

(65) Prior Publication Data

US 2023/0100308 A1 Mar. 30, 2023

(30) Foreign Application Priority Data

Sep. 28, 2021 (EP) .................................... 21199283

(51) Int. Cl.
*G01N 25/18* (2006.01)
*G01J 5/02* (2022.01)
*G01J 5/10* (2006.01)
*G01N 25/20* (2006.01)

(52) U.S. Cl.
CPC ............ *G01N 25/18* (2013.01); *G01J 5/0255* (2013.01); *G01J 5/10* (2013.01); *G01N 25/20* (2013.01)

(58) Field of Classification Search
CPC ....... G01N 25/18; G01N 25/70; G01J 5/0255; G01J 5/10

USPC .............................................. 374/121, 10, 44
See application file for complete search history.

(56) References Cited

U.S. PATENT DOCUMENTS

| 3,827,811 | A | * | 8/1974 | Kato | G02B 21/0096 |
| | | | | | 356/219 |
| 6,375,349 | B1 | * | 4/2002 | Gaal | G01N 25/18 |
| | | | | | 374/45 |
| 11,796,496 | B1 | * | 10/2023 | Gaal | G01N 1/44 |
| 2004/0079886 | A1 | | 4/2004 | Opfermann et al. | |
| 2009/0274191 | A1 | | 11/2009 | Hache et al. | |
| 2018/0246032 | A1 | * | 8/2018 | Li | G01N 21/3563 |

FOREIGN PATENT DOCUMENTS

| CN | 106841255 | A | | 6/2017 | |
| CN | 106841255 | B | * | 7/2019 | ....... G01N 23/20025 |
| CN | 114235166 | B | * | 6/2022 | ................ G01J 5/00 |
| DE | 10242741 | A1 | * | 4/2004 | ............. G01N 25/18 |

(Continued)

OTHER PUBLICATIONS

17936100_2025-01-06_CN_114235166_B_H.pdf Jun. 28, 2022.*

(Continued)

*Primary Examiner* — John E Breene
(74) *Attorney, Agent, or Firm* — Whitmyer IP Group LLC

(57) ABSTRACT

A device for determining the temperature conductivity, the heat capacity and/or the thermal conductivity of a material sample. The device has a light emitter for exposing a front side of the sample to a light energy beam and a radiation detector for determining the temperature rise at a rear side of the sample facing away from the front side by detecting the radiation emitted there as a function of temperature, and a sample holder for holding the sample in a defined position.

13 Claims, 4 Drawing Sheets

(56) References Cited

FOREIGN PATENT DOCUMENTS

| | | | | |
|---|---|---|---|---|
| EP | 3051278 A1 | * | 8/2016 | ............. G01N 25/18 |
| JP | 62050652 A | | 3/1987 | |
| JP | S6250652 A | * | 3/1987 | |
| JP | 2017117719 A | * | 6/2017 | |
| JP | H0763717 A | * | 10/2017 | |
| JP | 2019220484 A | * | 12/2019 | |
| WO | WO-0194922 A1 | * | 12/2001 | ............. G01B 11/08 |

OTHER PUBLICATIONS

17936100_2025-01-06_WO_0194922_A1_H.pdfDec. 13, 2001.*
17936100_2025-01-07_CN_106841255_A_H.pdfJul. 5, 2019.*
17936100_2025-01-07_CN_106841255_B_H.pdfApr. 1, 2004.*
17936100_2025-01-07_DE_10242741_A1_H.pdf,Apr. 1, 2004.*
17936100_2025-01-07_EP_3051278_A1_H.pdf,Aug. 3, 2016.*
17936100_2025-01-07_JP_2017117719_A_H.pdf,Jun. 29, 2017.*
17936100_2025-01-07_JP_2019220484_A_H.pdf,Dec. 26, 2019.*
17936100_2025-01-07_JP_H0763717_A_H.pdf,Oct. 12, 2017.*
17936100_2025-01-07_JP_S6250652_A_H.pdf,Mar. 5, 1987.*
17936100_2025-01-07_WO_2017175795_A1_H.pdf,Oct. 12, 2017.*
Extended European Search Report; Application No. EP21199283; Completed: Feb. 24, 2022; Mailing Date: Mar. 7, 2022; 5 Pages.

* cited by examiner

DEVICE FOR THE DETERMINATION OF TEMPERATURE PARAMETERS WITH ADJUSTABLE SAMPLE HOLDER

TECHNICAL FIELD

The invention relates to a device for determining the temperature conductivity, the heat capacity and/or the thermal conductivity or a comparable thermal index, according to the preamble of the claims.

BACKGROUND

Devices of the type according to the invention are known. In principle, they work according to the principle of light flash analysis (LFA), as illustrated by FIG. 1.

A vertical structure is usually chosen.

The energy pulse from a light source 1, usually a flash lamp or a laser, heats the front side 3 of a sample 2. A detector 5, usually in the form of an IR sensor, is arranged behind the sample as seen in the direction of irradiation. This detector 5 records the time-dependent temperature increase at the rear side 4 of the sample on the basis of the radiation emitted by the sample. Optionally, an optical system 6 can be provided to focus the radiation to be detected by the detector 5.

Since conductivity shows a significant dependence on temperature, the sample is usually heated with an oven 7. In this case, the measurement itself is isothermal.

From the signal of the detector 5, for example, the thermal conductivity can be calculated according to the following formula:

$$a = 0.1388 \cdot \frac{d^2}{t_{1/2}}$$

with a is the thermal conductivity d is the thickness of the sample $t_{1/2}$ is the half time Optimal test conditions are homogeneous material, a uniform energy input over the entire sample surface and a short energy pulse, preferably in the form of a delta function.

As a rule, these requirements are also met by the device according to the invention.

Technical Problem

The devices of the type according to the invention are intended to measure very different test specimens.

It is important that the specimen is held in a defined position so that the specimen holder does not falsify the measurement result.

The applicant has identified potential problems here in two areas in particular.

A falsification can result from the fact that the energy pulse of the light source 1 also partially hits the sample holder and is reflected from there in an uncontrolled manner. There is then a danger that part of the energy pulse of the light source hits the detector directly and not only indirectly via the sample and therefore falsifies the result.

Another potential source of falsification is the uncontrolled reflection of radiation already emitted by the sample. Here it can happen that radiation already emitted by the sample is reflected back to the sample, which also falsifies the measurement result.

SUMMARY

To solve this problem, a device according to the wording of the claims is proposed according to the invention.

As usual, the device for determining the temperature coefficient of conductivity, the heat capacity and/or the thermal conductivity—or a similar parameter of a material sample—is equipped with a light emitter for applying a light energy beam to the front side of the sample. At the same time, a radiation detector is provided. It is used to determine the temperature increase on a rear side of the sample facing away from the front side. For this purpose, the radiation emitted there, usually in the form of thermal radiation, is detected. The device according to the invention has a sample holder for holding/supporting the sample in a defined position. It is characterised by the fact that, viewed in the direction of radiation, a first adjustable aperture is arranged on the front side in front of the sample holder. The light energy beam passes through this before it hits the front side of the sample. At the same time, a second adjustable aperture is arranged on the rear side behind the sample holder.

An adjustable aperture within the meaning of the invention is understood here to be an aperture which has a variable size so that the aperture can be changed without having to remove the the device forming the aperture and install another device of this type.

In this way, the first aperture in the device according to the invention can always be adjusted in such a way that it shades the interfering sections of the specimen holder. For example, in such a way that the sections of the specimen holder that are not used by the specimen to be measured due to its geometry, but lie freely to the side of the specimen, are not hit by the light energy beam and/or in such a way that the sections of the specimen holder that reach under the specimen and hold it are also not hit by the light energy beam.

At the same time, in the device according to the invention, the second aperture can in this way always be adjusted in such a way that it shades irrelevant edge regions on the back of the sample, which might otherwise receive radiation that has already been emitted by the region to be measured and is now thrown back due to reflection processes, which falsifies the measurement.

In slightly different words, it can be said that the construction according to the invention is preferably characterised by the fact that the two adjustable apertures receive the sample between them in a sandwich manner, i.e. in such a way that each of the adjustable apertures is no more than preferably 10 cm better only 5 cm away from the irradiated or detected surface of the sample and thus shades or fades out disturbancies in a particularly effective manner.

Optional Improvements

Ideally, the adjustable apertures are designed as irises or iris shades, preferably as follows: They have a number of movable blades, usually at least 6 blades, preferably at least 10 blades. Each of the blades is held on a fixed axis of rotation. Each of the blades slides with a corresponding guide in a rotating ring. Depending on the direction in which the rotating ring is turned, the blades swivel inwards together, thereby reducing the aperture, or outwards, thereby increasing the aperture.

It is particularly preferred if the sample holder offers adjustable supports for the respective sample.

The adjustable supports can then be positioned in such a way that only a relatively small piece of them reaches under the specific sample to be measured to hold it in a stationary position. Ideally, the specimen holder will include several, preferably three or sometimes four, pins that can be moved back and forth in a radial direction. To hold a sample with a small diameter, the pins are pushed close together in the radial direction. To hold a sample with a comparatively large diameter, the pins are pulled far apart in the radial direction.

It is particularly advantageous for the specimen holder to comprise a specimen holder ring that forms radial guides for the pins and ideally provides a seat for each of the adjustable apertures Or the devices forming it, so that their correct positioning is also ensured. In this way, a sample holder unit is created that can be easily positioned in the corresponding device.

Preferably, at least one of the adjustable apertures or devices forming it can be removed from the specimen holder ring without tools for the purpose of easily placing the specimen on the supports or pins of the specimen holder.

Further design possibilities, modes of action and advantages can be seen in the figurative description of a concrete example of an embodiment.

DETAILED DESCRIPTION

Figure 1:
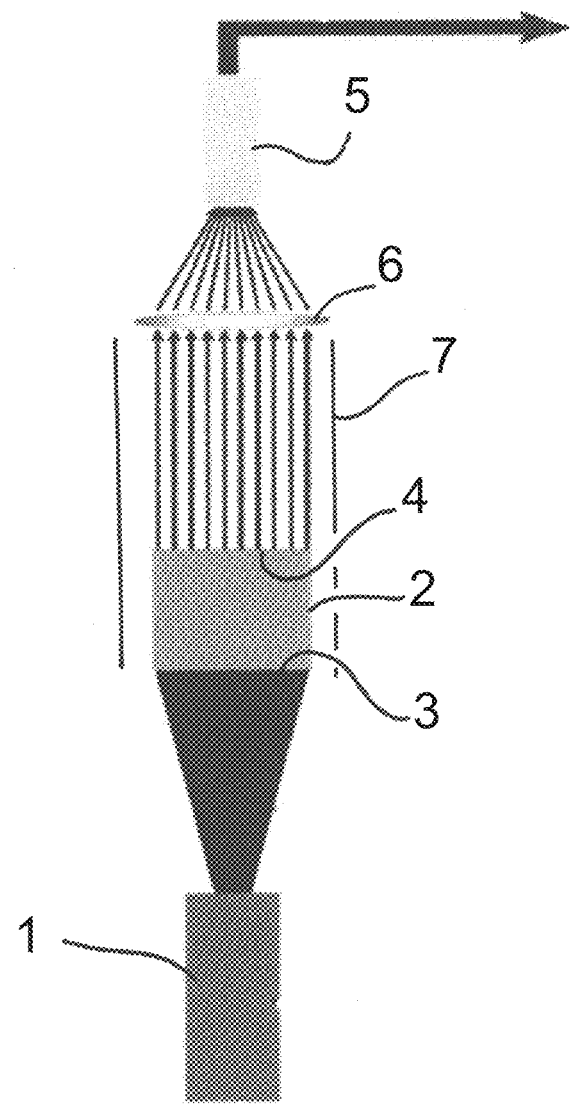
FIG. 1 illustrates the basic construction of the generic measuring instruments.
Figure 2:
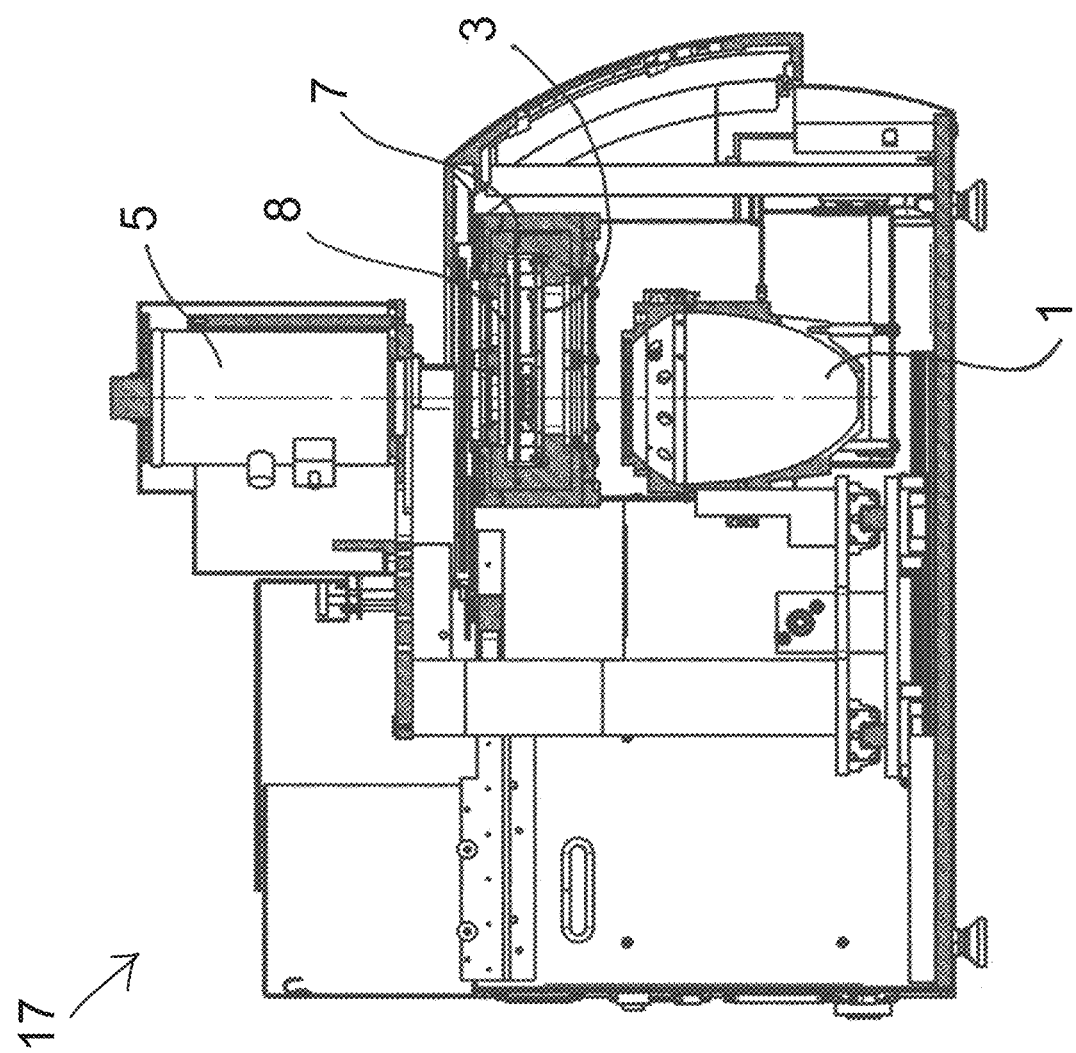
FIG. 2 shows a measuring device according to the invention in longitudinal section.

FIG. 2 shows the entire structure of a preferred measuring device according to the invention.

In the lowest area you can see the light source 1, which radiates upwards to the front side 3 of the sample 2. The sample 2 is here placed in the oven 7 together with the sample holder 8. On the back of the sample, above it, is the detector 5.

Figure 3:
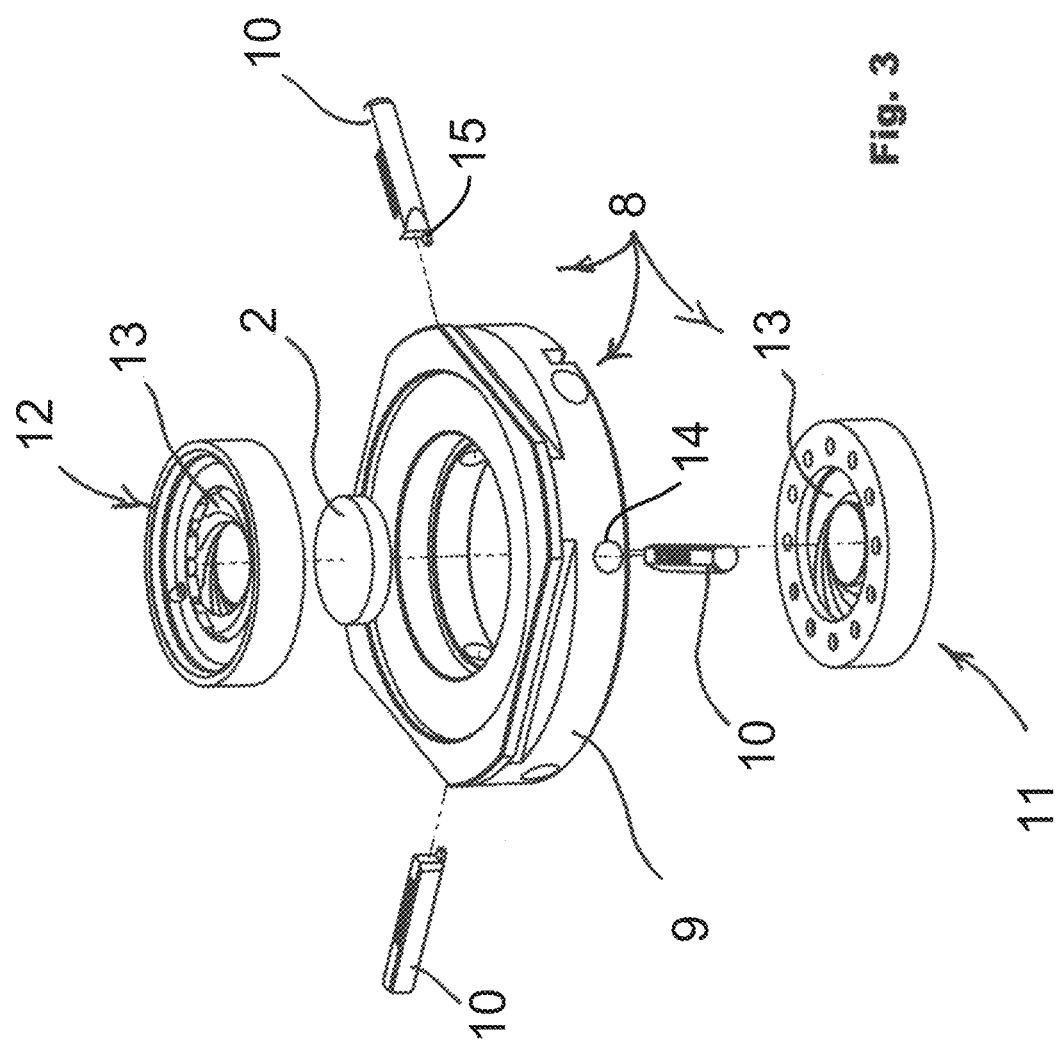
FIG. 3 shows the details of the invention in the area of the specimen holder.

The details can be seen clearly in FIG. 3. The actual sample holder 8 here consists of a sample holder ring 9, the pins 10 for holding the sample and the first adjustable aperture 11, as well as the second adjustable aperture 12. They can form a pre-assembled unit.

It is clearly visible that the two adjustable apertures are designed here as irises, with the classic, in the broadest sense, crescent-shaped, swivelling slats 13, as is typical for iris diaphragms.

As you can see, the pins 10 are specially designed.

They have a small projection 15 at their radially inner ends for gripping underneath the sample 2.

The pins 10 are guided in the radial bores 14 of the specimen holder ring 9 so that they can be moved and at the same time fixed. The guide is usually designed in such a way that the pins are held in a defined rotational position in the specimen holder ring 9 so that their small projections 15 are always at the bottom, at the lowest point.

The pins 10 can therefore be very easily adjusted radially so that only their small extensions 15 reach under the sample 2. The areas of the pins 10 that lie next to the specimen and protrude far into the specimen space can easily be blanked out by adjusting the apertures 11 and 12 accordingly.

Figure 4:
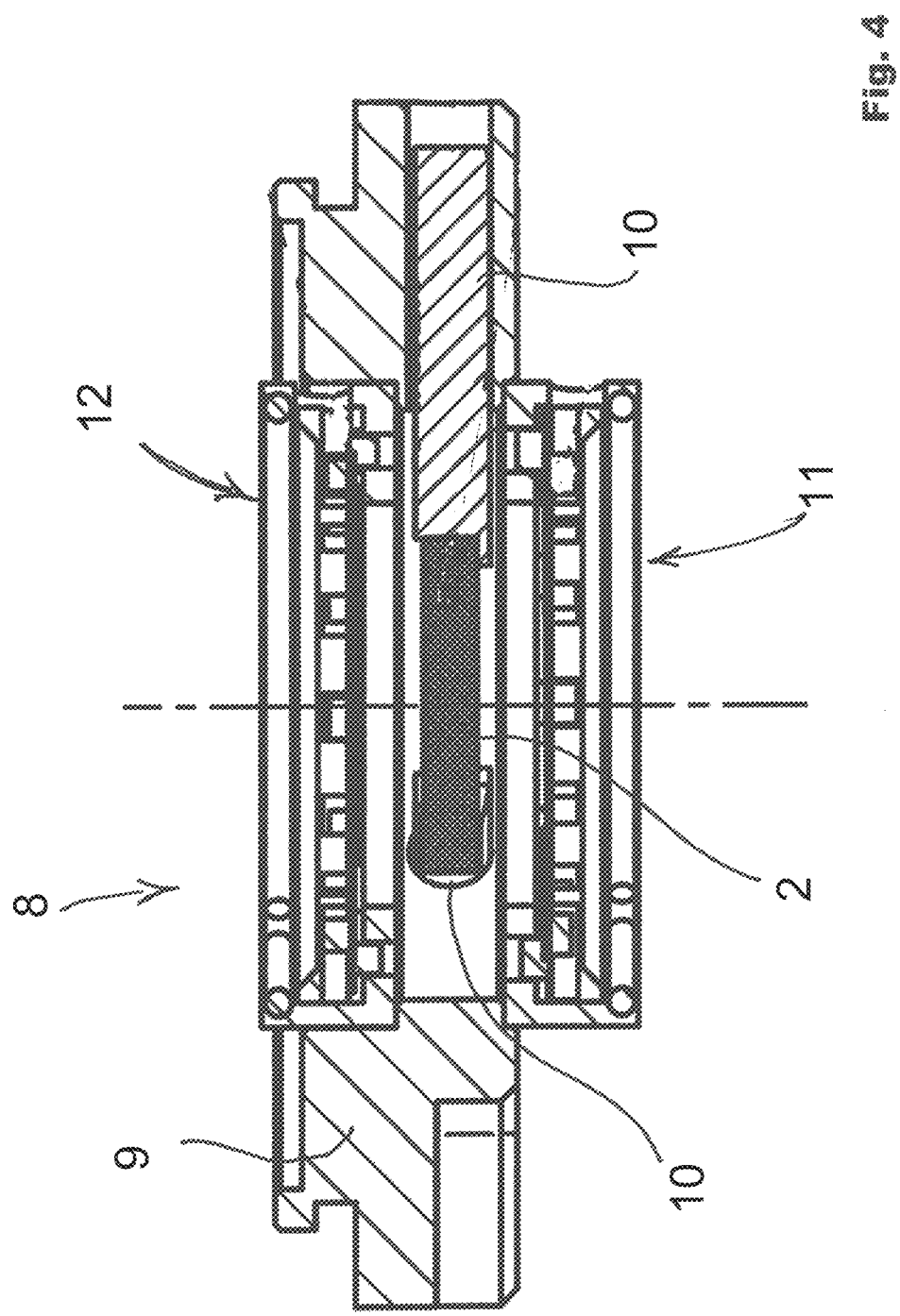
FIG. 4 shows an axial section through a specimen holder unit according to the invention with two adjustable apertures which receive the specimen between them.

It should be noted that the first adjustable aperture 11 or, more exactly, the device forming it, can be screwed, pressed or glued to the sample holder ring 9, as it does not have to be removed for loading a sample, cf. also FIG. 4.

The second adjustable aperture 12, on the other hand, is simply placed on top of the sample holder ring, where it is centred in and held by the sample holder ring 9 by a seating surface associated with it. In this way, the second adjustable aperture 12 can be easily removed by hand and without tools when loading the device from above in order to place the sample 2 on the pins 10. The latter are positioned "sandwiched", as it were, between the adjustable apertures 11 and 12.

As FIG. 4 clearly shows, it can be very advantageous for the two adjustable apertures 11 and 12 or, more exactly, the devices forming it, to be positioned very close to each other or one above the other. In the solution shown in FIG. 4, the two adjustable opertures are directly adjacent to the supports or pins holding the sample on one side and the other. Here you can see the advantages of the projections 15 on the pins 10 or supports—the sample does not rest on the space consuming solid or "fat" area of the pins 10, so that the sample thickness and the pin thickness or the full pin diameter do not add up in direction of irradiation. Instead, viewed in the direction of irradiation, the sample lies essentially or at least predominantly between the pins or supports. In general, it can be said that the distance between the two adjustable apertures is at most 4 times, better at most 2.5 times the sample thickness in the direction of irradiation.

Miscellaneous

A final remark of general nature has to be made:

When the time has come protection will also be sought for a device 17 for determining the temperature conductivity, the heat capacity and/or the thermal conductivity of a material sample, having a light emitter 1 for exposing a front side 3 of the sample 2 to a light energy beam and a radiation detector 5 for determining the temperature rise at a rear side 4 of the sample 2 facing away from the front side 3 by detecting the radiation emitted there as a function of temperature, and a sample holder 8 for holding the sample 2 in a defined position, characterized in that at least one adjustable aperture, designed in an iris-like manner by movable blades defining a smaller or bigger aperture between then, depending from their actual swivel position, is provided for shading a portion of the sample.

Preferably the said the device forming the iris-like aperture is positioned directly adjacent to the sample holder.

The invention claimed is:

1. A device for determining a temperature coefficient of conductivity, a heat capacity and/or a thermal conductivity of a material sample, comprising:
  a light emitter for exposing a front side of the sample to a light energy beam,
  a radiation detector for determining a temperature rise at a rear side of the sample facing away from the front side by detecting the radiation emitted there as a function of temperature, and
  a sample holder for holding the sample in a defined position, wherein a first aperture is arranged on the front side in front of the sample holder, wherein the light energy beam passes through the first aperture before it strikes the front side of the sample, and wherein a second aperture is arranged on the rear side behind the sample holder, wherein the apertures are irises with blades which rotate together inwards or outwards by means of a mechanism to form a smaller or larger aperture opening between them.

2. The device according to claim 1, wherein the sample holder comprises several supports or pins which are displaceable in the radial direction.

3. The device according to claim 2, wherein the specimen holder comprises a specimen holder ring forming radial guides for the pins and a seat for each of the apertures.

4. The device according to claim 3, wherein at least one of the apertures can be removed from the specimen holder ring without tools for the purpose of specimen installation.

5. A device for determining a thermal index of a material sample, comprising:
   a light emitter for exposing a front side of the sample to a light energy beam,
   a radiation detector for determining a temperature rise at a rear side of the sample facing away from the front side by detecting the radiation emitted there as a function of temperature, and
   a sample holder for holding the sample in a defined position, wherein a first aperture is arranged on the front side in front of the sample holder, wherein the light energy beam passes through the first structure before it strikes the front side of the sample, and wherein a second aperture is arranged on the rear side behind the sample holder,
   wherein the sample holder comprises several supports or pins which are displaceable in the radial direction.

6. The device of claim 5 wherein the thermal index is temperature coefficient of conductivity.

7. The device of claim 5 wherein the thermal index is heat capacity.

8. The device of claim 5 wherein the thermal index is thermal conductivity.

9. The device according to claim 2, wherein said several supports or pins comprises three supports or pins.

10. The device according to claim 5, wherein said several supports or pins comprises three supports or pins.

11. The device according to claim 5, wherein the specimen holder comprises a specimen holder ring forming radial guides for the pins and a seat for each of the apertures.

12. The device according to claim 11, wherein at least one of the apertures can be removed from the specimen holder ring without tools for the purpose of specimen installation.

13. The device according to claim 5, wherein each aperture is an iris which comprises blades and a mechanism that rotates the blades together inwards or outwards to form a smaller or larger aperture opening between them.

* * * * *